United States Patent [19]

Nishiki et al.

[11] Patent Number: 5,015,354

[45] Date of Patent: May 14, 1991

[54] BIPOLAR-ELECTRODE ELECTROLYTIC CELL

[75] Inventors: Yoshinori Nishiki; Isao Sawamoto, both of Kanagawa; Shuji Nakamatsu, Kanagawa; Takayuki Shimamune, Tokyo, all of Japan

[73] Assignee: Permelec Electrode Ltd., Kanagawa, Japan

[21] Appl. No.: 349,617

[22] Filed: May 10, 1989

[30] Foreign Application Priority Data

May 11, 1988 [JP] Japan .................. 63-114389

[51] Int. Cl.⁵ .................. C25B 9/00; C25B 11/10
[52] U.S. Cl. .................. 204/254; 204/255; 204/256; 204/282; 204/283; 204/290 F; 204/292; 204/296
[58] Field of Search .................. 204/254–258, 204/283, 290 F, 292, 296, 282

[56] References Cited

U.S. PATENT DOCUMENTS

| | | | |
|---|---|---|---|
| 2,829,095 | 4/1958 | Oda et al. | 204/257 X |
| 4,252,628 | 2/1981 | Boulton et al. | 204/257 |
| 4,402,810 | 9/1983 | Boulton et al. | 204/255 |
| 4,413,041 | 11/1983 | Hegedus | 429/33 |
| 4,734,181 | 3/1988 | Cipriano | 204/257 |
| 4,755,272 | 7/1988 | Plowman | 204/256 |

FOREIGN PATENT DOCUMENTS 2387297 12/1978 France .................. 204/257

OTHER PUBLICATIONS

Patent Abstracts of Japan, vol. 7, No. 201 (C-184)[1346], Sep. 6, 1983.
JP-A-58100686 (Musashino Kagaku Kenkyusho K.K.) June 15, 1983.

Primary Examiner—Donald R. Valentine
Attorney, Agent, or Firm—Sughrue, Mion, Zinn, Macpeak & Seas

[57] ABSTRACT

A bipolar-electrode electrolytic cell is disclosed, which is to be used in electrolysis of an electrolytic solution having a high electric resistance and including at least two diaphragms positioned to form a plurality of electrode compartments comprising two outer compartments defined between the side walls of the electrolytic cell and the diaphragms positioned closest to the cell walls having a single electrode and at least one electrode compartment having two same-polar electrodes on both sides thereof, each of said electrodes being placed on a diaphragm such that different-polar electrodes are positioned at opposing sides of the diaphragm, wherein the distance between same-polar electrodes within the same compartment is sufficiently large such that electrolysis therebetween does not substantially occur and wherein two of said electrodes at the terminal ends of the series connected electrolytic cell, an anode and a cathode, being further electrically connected to an anode collector and a cathode collector, respectively, and each of the remaining anode electrodes and cathode electrodes is further connected to a different-polar electrode, respectively, which face the same direction and are placed on adjacent diaphragms.

9 Claims, 2 Drawing Sheets

BIPOLAR-ELECTRODE ELECTROLYTIC CELL

FIELD OF THE INVENTION

The present invention relates to a bipolar-electrode electrolytic cell for use in electrolysis of an electrolytic solution having a high electric resistance, e.g. municipal water or organic aqueous solutions.

BACKGROUND OF THE INVENTION

Electrolysis utilizing a plurality of electrolytic cells can comprise a bipolar-electrode system or a monopolar-electrode system, depending on the manner of electrical interconnection thereof.

In the bipolar-electrode system, a plurality of electrolytic cells are electrically connected in series, i.e., cathode - anode - cathode - anode - cathode. The series bipolar-electrode electrolytic cell draws relatively low current, although the voltage applied thereto is large. Moreover, electrical interconnection is facilitated and the current is uniformly distributed to the electrolytic cells. However, if the electrolytic compartments of the bipolar-electrode type electrolytic cell are connected by conduits, a stray current arises which by-passes the electrolytic solution. This stray current decreases the efficiency of the electrolytic cell and causes corrosion of valves, piping and other facility components.

On the other hand, in the monopolar-electrode system, the electrolytic cells are connected in parallel such that the current is also distributed in parallel to the electrolytic cells. Thus, although the voltage applied to the monopolar-electrode system is smaller, a larger current is needed. The electric power source is inevitably larger, and the current is not always uniformly distributed to the electrolytic cells.

On weighing the advantages and disadvantages of the bipolar electrode system and the monopolar-electrode system, one system is selected and in order to overcome the above problems, various solutions have been proposed.

In the bipolar-electrode system, leakage current is prevented by strictly separating electrolyte liquids in adjacent electrode compartments. This, however, takes away from the desirable features of the bipolar-electrode system (i.e., simple structure and potential for miniaturization). Even when the electric resistance of electrolyte liquid is particularly large, the above separation is still carried out taking leakage current overly into account.

SUMMARY OF THE INVENTION

The present invention overcomes the above-noted problems. The object of the present invention is to provide, as an electrolytic cell for electrolysis of an electrolytic solution having a large electric resistance, a bipolar-electrode type electrolytic cell having a simplified structure.

The present invention provides a bipolar-electrode type electrolytic cell for electrolysis of an electrolytic solution having a high electric resistance, including at least two diaphragms positioned to form a plurality of electrode compartments comprising two outer compartments defined between the side walls of the electrolytic cell and the diaphragms positioned closest to the cell walls having a single electrode and at least one electrode compartment having two same-polar electrodes on both sides thereof, each of said electrodes being placed on a diaphragm such that different-polar electrodes are positioned at opposing sides of the diaphragm, wherein the distance between same-polar electrodes within the same compartment is sufficiently large such that electrolysis therebetween does not substantially occur and wherein two of said electrodes at the terminal ends of the series connected electrolytic cell, an anode and a cathode, are electrically connected to an anode collector and a cathode collector, respectively, and each of the remaining anode electrodes and cathode electrodes is electrically connected to a different-polar electrode, respectively, which face the same direction and are placed on adjacent diaphragms.

DETAILED DESCRIPTION OF THE INVENTION

Figure 1:
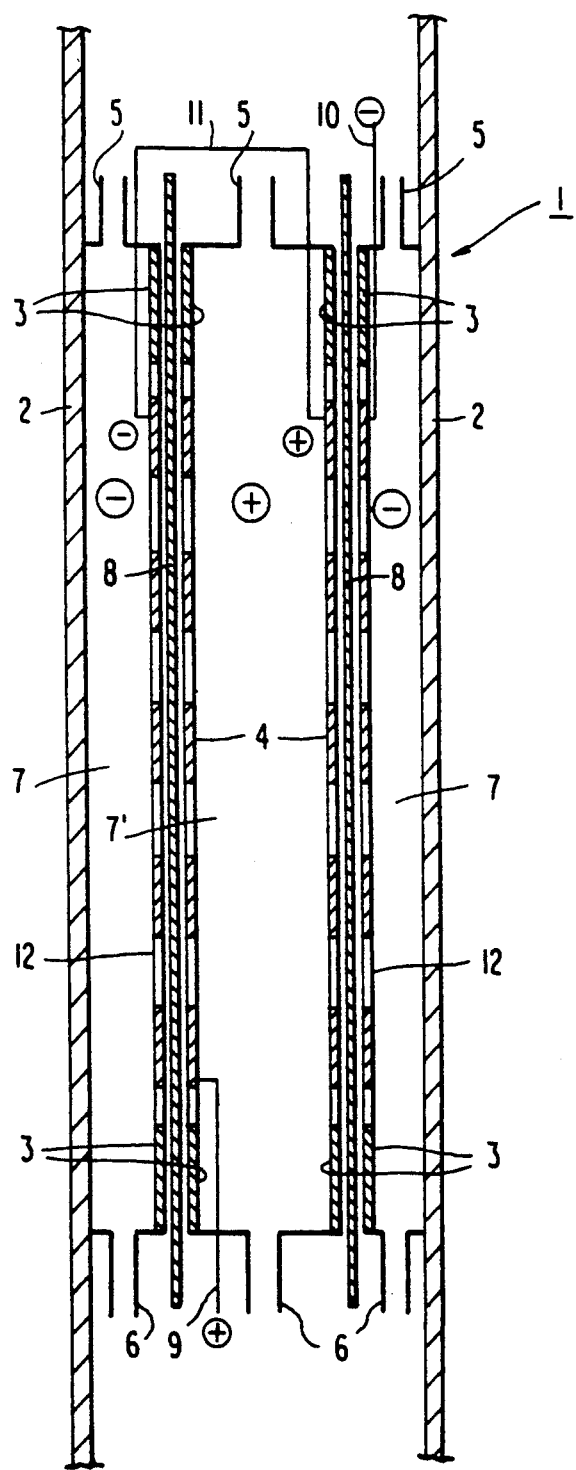
FIG. 1 is a partial longitudinal sectional view of a preferred embodiment of the bipolar-electrode type electrolytic cell of the present invention.

In a conventional series connected bipolar-electrode type electrolytic cell, only one electrode is provided in each compartment. That is, same-polar electrodes are separated with a diaphragm or wall into separate electrode compartments. For example, in the construction of a conventional series connected 5-element cell, five anode compartments and five cathode compartments, i.e., a total of ten compartments are needed. Furthermore, the large number of compartments complicates the piping and the feature of simple construction desirable in the bipolar-electrode type electrolytic cell is lost.

In the present invention, however, the diaphragm or wall separating same-polar electrodes in the conventional bipolar-electrode type electrolytic cell is removed, and two same-polar electrodes are provided on opposite sides within the same compartment. In this manner, the number of compartments is reduced by about one-half. Additionally, the facility components, e.g., piping, are simplified, the total electrolytic cell including the facility components is miniaturized, and the desirable features of the bipolar-electrode type electrolytic cell are preserved.

However, in the above described bipolar-electrode type electrolytic cell wherein the diaphragm or wall is removed, an electric potential difference corresponding to the voltage of one of the series connected electrolytic cells is developed between same-polar electrodes within the same compartment. Accordingly, the electrode having a higher electric potential of the two electrodes within the same compartment acts as an anode and the other acts as a cathode. Thus there is a danger of an undesired electrolytic reaction occuring between the two electrodes within the same compartment. In order to prevent the undesired electrolytic reaction, it is necessary to increase the electric resistance between the two same-polar electrodes. Thus the electrolytic cell of the present invention is limited to an electrolytic cell using an electrolytic solution having an electric resistance generally as high as 10 $\Omega$cm or more and preferably 1 k$\Omega$cm or more, such as municipal water or organic aqueous solutions having such a high liquid resistance.

Moreover, in order to greatly increase the electric resistance between the above two same-polar electrodes within the same compartment greater than, preferably about 10 times, the electric resistance of the objective electrode reaction occuring between different-polar electrodes positioned at opposing sides of a diaphragm, it is preferred that the compartment thickness (the distance between the two same-polar electrodes in the same compartment) be greater than the distance between the above different-polar electrodes (the thickness of the diaphragm + the total of the distances between the diaphragm and each of the different-polar electrodes placed on opposing sides of the diaphragm). For example, if the distance between different-polar electrodes is 2 mm, the distance between the same-polar electrodes within the same compartment of the present invention is increased to about 20 mm.

Even if the distance between same-polar electrodes within the same compartment is increased to increase the electric resistance therebetween, the above-noted undesired reaction will occur, and the primary product becomes contaminated with gas formed at the opposing same-polar electrodes. For example, if ozone is produced by electrolysis of water by the use of the electrolytic cell of the present invention, mainly oxygen gas containing ozone is formed in the anode compartment containing a pair of same-polar electrodes. However, in the electrolytic cell of the present invention, a first electrode having a lower electric potential of the above anode electrodes acts as a cathode relative to the second anode electrode of higher potential such that a very small amount of hydrogen gas is formed at the first electrode which mixes with the above main product (oxygen gas containing ozone). However, in the present invention, the proportion of undesired gas is readily controlled to not more than 5 vol%. In practice, electrolysis is first conducted to form a product gas in the anode compartment. Assuming that bubble content in the electrolytic liquid is 8.5 vol%, the conductance of the liquid containing bubble is then decreased by a factor of 20 to decrease the proportion of undesired gas to not more than 2.5 vol%. In the electrolysis of water, the explosion limit of hydrogen in oxygen is 4 vol%, so that there is no danger of explosion using the electrolytic cell of the present invention. Even in the case of contaminants other than hydrogen gas, contamination of the reaction product in a proportion of not more than 5 vol% is not a substantial problem. However, when a greater degree of separation is needed, the width of the compartments is increased such that the electric resistance between same-polar electrodes in the same compartment is made much greater than the electric resistance between different-polar electrodes with the diaphragm interposed therebetween. The electric resistance is that necessary to form the product gas at the desired purity.

By circulating the electrolytic solution in the compartment to thereby externally cool the electrolytic solution, the temperature of the electrolytic cell can be regulated.

The bipolar-electrode electrolytic cell of the present invention comprises two types of compartments. A first type of compartment (outer compartment) is defined between the electrolytic cell side wall and the diaphragm positioned nearest to the side wall and contains a single electrode placed to the diaphragm. A second type of compartment (inner compartment) is defined between adjacent diaphragms and contains two same-polar electrodes placed on each of the diaphragms defining the compartment. As those members, conventional electrodes may be used.

These electrodes are electrically connected such that the two electrodes at the terminal ends of the series connected electrolytic cell, an anode and a cathode, are connected to an anode collector and cathode collector respectively, and each of the remaining anode electrodes and cathode electrodes is connected to a different-polar electrode, respectively, which are placed onto adjacent diaphragms, and face the same direction, in other words, which are separated by a diaphragm.

More specifically, for electrolytic cells having an even number of at least four compartments (an odd number of at least three diaphragms), the anode and cathode electrodes separately present in the outer anode and cathode compartments are further connected to an anode and cathode collector, respectively. The anode and cathode collectors are further connected to a power source during electrolysis. The inner anode and cathode electrodes are further connected to different-polar electrodes which face the same direction and are placed on adjacent diaphragms.

For electrolytic cells having an odd number of a least three compartments (an even number of at least two diaphragms), the electrode separately present in one of the outer compartments is further connected to a collector. One of the inner electrodes of opposing polarity to the outer electrode is further connected to a second collector, also of opposing polarity. The remaining electrodes are further connected to different-polar electrodes which face the same direction and are placed on adjacent diaphragms.

This configuration produces an electric potential difference corresponding to a cell voltage of one of the series connected cells between the two same-polar electrodes present in the same compartment. However, as described above, the undesired electrolysis due to this electric potential difference is controlled by adjusting the distance between electrodes and the electric resistance of electrolytic solution.

The present invention is further explained with reference to the examples as illustrated in the attached drawings, although the present invention is not limited thereto.

FIG. 1 is a partial longitudinal sectional view of an embodiment of the bipolar electrode type electrolytic cell of the present invention.

Side wall 2 at both sides of electrolytic cell 1 and one side of each of frames 3 define cathode electrode compartments 7. Cathode electrodes 12 are positioned in frames 3, and electrolytic solution-withdrawing outlet 5 and electrolytic solution-supplying inlet 6 are provided at upper and lower ends, respectively, of cathode electrode compartments 7.

Anode electrode compartment 7' is defined between both diaphragms 8 positioned in frames 3. Anode electrodes 4 are positioned in frames 3, and electrolytic solution-withdrawing outlet 5 and electrolytic solution-supplying inlet 6 are provided at upper and lower ends, respectively, of anode electrode compartment 7'.

To electrode 4 at the left side of the central anode compartment 7' is connected anode collector 9 from below, and to electrode 12 of cathode electrode compartment 7 at the right side of the cell is connected cathode collector 10 from above. Upper parts of electrode 12 of electrode compartment 7 at the left side and of electrode 4 at the right side of central electrode compartment 7' are connected together with electrical wire 11.

When an electric power source is applied to anode collector 9 and cathode collector 10 in the electrolytic cell of the present example having the aforementioned structure, electricity flows in the order of anode electrode 4 at the left side of central anode electrode compartment 7' → diaphragm 8 → cathode electrode 12 of left electrode compartment 7 → wire 11 → anode electrode 4 at the right side of central anode electrode compartment 7' → diaphragm 8 → cathode electrode 12 of right cathode electrode compartment 7, and is withdrawn from cathode collector 10. At this time, if municipal water is supplied through electrolytic solution-supplying inlet 6 as the electrolytic solution, in central electrode compartment 7' as the anode compartment, oxygen gas containing ozone is generated by the anode reaction and withdrawn through electrolytic solution-withdrawing outlet 5. On the other hand, in electrode room 7 at both sides as cathode compartments, hydrogen gas is generated and withdrawn through electrolytic solution-withdrawing outlet 5.

Since the electric current flows according to the path as described above, and electric potential difference is developed between same-polar electrodes 4 at both sides of central electrode compartment 7', and the potential of electrode 4 at the left side is higher than that of electrode 4 at the right side. Accordingly, if the electric resistance of the liquid present between electrodes 4 is small, or the distance between electrodes 4 is small, electrode 4 at the left side of compartment 7' acts as an anode and electrode 4 at the right side of compartment 7' acts as a cathode. Thus, between both same-polar electrodes 4, oxygen gas (and ozone) and a small amount of hydrogen gas is generated by the electrolytic reaction of water. In central electrode compartment 7', oxygen gas containing ozone contaminated with hydrogen gas is obtained. In the present example, however, the electric resistance of the electrolytic solution is sufficiently high and the distance between electrodes 4 is sufficiently great such that the electric resistance between same-polar electrodes 4 is much larger than the electric resistance between different-polar electrodes 4 and 12 adjacent to each other through diaphragm 8. Therefore, the extent of the undesired electrolytic reaction between same-polar electrodes 4 in electrode compartment 7' is negligible.

Figure 2:
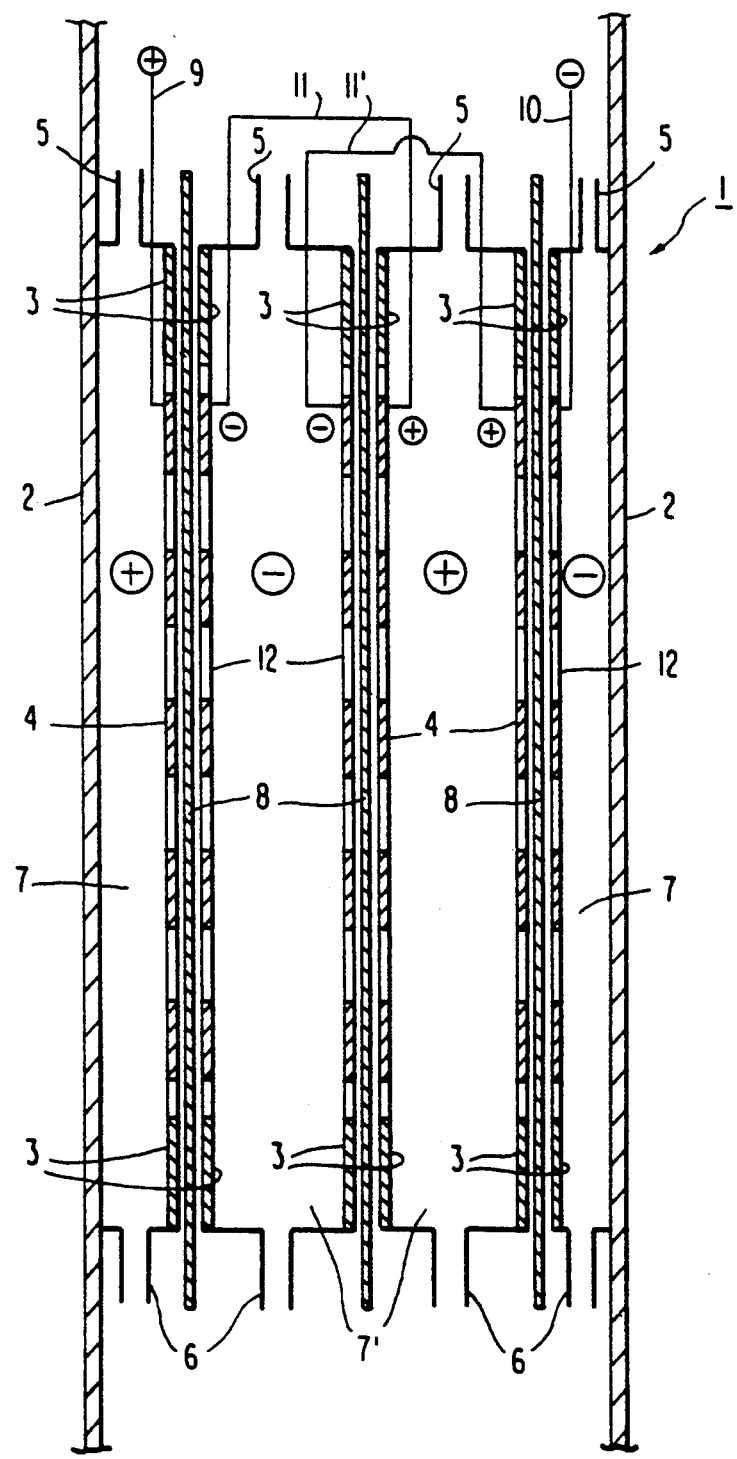
FIG. 2 is a partial longitudinal sectional view of another preferred embodiment of the bipolar-electrode type electrolytic cell of the present invention.

FIG. 2 is partial longitudinal sectional view of another example of the bipolar-electrode type electrolytic cell of the present invention. The reference numbers in the first example also apply to the present example.

Outer electrode compartments 7 are defined between diaphragms 8 positioned closest to the side walls 2 of the electrolytic cell 1. Electrode compartment 7 at the left side forms an anode compartment and electrode compartment 7 at the right side forms a cathode compartment.

Two inner electrode compartment 7' between electrode compartments 7 having the same construction as in the first example are defined by the three diaphragms 8. The left compartment 7' forms a cathode compartment and the right compartment 7' forms an anode compartment.

To electrode 4 of electrode compartment 7 at the left side is connected anode collector 9 from above, and to electrode 12 of the electrode compartment 7 at the right side is connected cathode collector 10 from above. Upper parts of electrode 12 at the left side of left electrode compartment 7' and of electrode 4 at the left side of right electrode compartment 7' are connected with electrical wire 11. Moreover, upper parts of electrode 12 at the right side of left electrode compartment 7' and of electrode 4 at the right side of right electrode compartment 7' are connected with electrical wire 11'.

When an electric power source is applied to anode collector 9 and cathode collector 10 to the electrolytic cell of the present example, electricity flows similarly to the first example in the order of anode electrode 4 of left electrode compartment 7 - left diaphragm 8 - cathode electrode 12 at the left side of left electrode compartment 7' - wire 11 - anode electrode 4 at the left side of right electrode compartment 7' - center diaphragm 8 - cathode electrode 12 at the right side of left electrode compartment 7' - wire 11' - anode electrode 4 at the right side of right electrode compartment 7' - right diaphragm 8 - cathode electrode 12 of right electrode room 7, and is withdrawn from cathode collector 10.

As in Example 1, oxygen gas containing ozone is generated in the anode compartments and hydrogen gas is generated in the cathode compartments. In electrode compartment 7' at the right side, the main electrolysis reaction occurs almost selectively to the above-noted undesired reaction because the electric resistance of the electrolytic solution is large and the electrode distance between same-polar anode electrodes within the same compartment is sufficiently large. Thus, oxygen gas substantially free of hydrogen and hydrogen gas substantially free of oxygen is obtained from the anode and cathode compartments, respectively.

In the bipolar-electrode type electrolytic cell of the present invention, the number of compartments is reduced by about one-half that of a conventional electrolytic cell. The electrolytic cell of the present invention employs inner electrode compartments containing same-polar electrodes positioned sufficiently apart to minimize undesired reactions and can be employed with electrolytic solutions including municipal water or organic aqueous solutions having a large electric resistance.

In a conventional electrolytic reaction, if two or more electrodes having an electric potential difference therebetween are placed in a single compartment, one of the electrodes acts as an anode (higher potential) and the other as a cathode (lower potential). As a result, both an anode product and a cathode product are formed in the single compartment. In the present invention, on the other hand, an electrolytic solution having a large electric resistance is employed, and the distance between same-polar electrodes having different potentials present in the same compartment is increased to make the electric resistance between same-polar electrodes much greater than, preferably at least 10 times, the electric resistance between different-polar electrodes on opposing sides of the common diaphragm, such that the main electrode reaction between different-polar electrodes proceeds selectively.

Accordingly, high purity anode and cathode products are obtained. Moreover, the amount of contaminating side product can be further decreased by controlling the electric resistance and the distance between electrodes without adversely affecting the desired product.

In the bipolar-electrode type electrolytic cell of the present invention, the number of compartments is decreased by about one-half that of a conventional electrolytic cell. Moreover, the desirable features of a bipolar-electrode type electrolytic cell including small size and reduced facilities is fully realized.

The present invention is described in greater detail with reference to the following examples.

EXAMPLE 1

An electrolytic cell with the structure shown in FIG. 1 for use in the electrolysis of water was constructed. As a diaphragm, a porous membrane of a fluorine resin (pore size: 5 μm) was used. A nickel mesh was used as a cathode, and a platinum-plated titanium mesh was used as an anode. The width of the central electrode compartment was 20 mm. The diaphragm was sandwiched between the anode and the cathode.

Municipal water (resistance 5,000 Ωcm) was used as an electrolytic solution and was subjected to electrolysis. The state of electrolysis in the anode compartment was checked. A gas chromatographic analysis showed that the amount of hydrogen in the oxygen product gas generated in the anode compartment was 0.2 vol%. Thus, the undesired electrolytic reaction between same-polar electrodes in the anode compartment was neglegible.

In the present electrolysis, acidic water having a pH of 3 to 6 was obtained from the anode compartment, and alkali ion water containing calcium was obtained from the cathode compartment.

EXAMPLE 2

A cation exchange membrane (trade name, Nafion #117, produced by du Pont) was used as a diaphragm. A porous titanium plate provided with a 1 mm-thick surface layer of $\beta$-lead dioxide served as an anode, and a porous 1-mm thick nickel plate served as a cathode. An electrolytic cell having the above components and electrically wired as shown in FIG. 2 was constructed. Electrolysis was carried out in the above electrolytic cell. The diaphragm was sandwiched between the anode and the cathode such that the distance between the diaphragm and each of the electrodes was nearly zero.

The electrolytic solution, in both the anode and cathode compartments, comprised a mixed aqueous acid of 5 g/l of sulfuric acid and 2 g/l of hydrofluoric acid. While circulating the cathode solution for cooling at such a rate that the liquid volume of the electrolytic cell was circulated five times per minute, electrolysis was carried out at a current density of 100 A/dm$^2$. The cell voltage per cell was about 5 V, and the cell temperature was maintained at 30° C.

Gas in the anode compartment was analyzed in the same manner as in Example 1. Oxygen gas containing 10 vol% of ozone was obtained. The hydrogen gas contained in the oxygen gas was 0.2 vol%, which is considered to be neglegible.

While the invention has been described in detail and with reference to specific embodiments thereof, it will be apparent to one skilled in the art that various changes and modifications can be made therein without departing from the spirit and scope thereof.

What is claimed is:

1. A bipolar-electrode type series connected electrolytic cell for electrolysis of an electrolytic solution having a high electric resistance, including at least first and second diaphragms positioned to form a plurality of electrode compartments;

said compartments comprising a first outer compartment defined between a first side wall of the electrolytic cell and said first diaphragm positioned closest to said first side wall and in opposed relation thereto, a second outer compartment defined between a second side wall of the electrolytic cell and said second diaphragm positioned closest to said second side wall and in opposed relation thereto, and at least one inner electrode compartment defined between adjacent diaphragms;

said first and second outer compartments each containing a single electrode placed on said first and second diaphragms respectively, said at least one inner compartment containing two same-polar electrodes, each electrode of which is placed on an adjacent diaphragm defining said at least one inner compartment;

said electrodes being arranged such that different-polar electrodes are placed at opposing sides of each diaphragm, and such that the distance between same-polar electrodes within the same inner compartment is sufficiently large such that electrolysis therebetween does not substantially occur;

wherein two different-polar electrodes at the terminal ends of the series connected electrolytic cell are each electrically connected to a collector, and each of the remaining anode electrodes and cathode electrodes is electrically connected to a different-polar electrode present on an adjacent diaphragm.

2. An electrolytic cell as in claim 1, wherein the electric resistance between same-polar electrodes within the same compartment is at least ten times the resistance between different-polar electrodes placed on opposing sides of the diaphragm.

3. An electrolytic cell as in claim 1, further comprising an electrolytic solution contained in the compartments, wherein the electrolytic solution is circulated to prevent an increase in the cell temperature.

4. An electrolytic cell as in claim 1, wherein the electrolytic solution is water, and oxygen containing ozone gas is mainly formed in compartments having anode electrodes and hydrogen gas is mainly formed in compartments having cathode electrodes.

5. An electrolytic cell as in claim 4, wherein not more than 2.5 vol% of hydrogen is formed in the anode compartments.

6. An electrolytic cell as in claim 1 having a single inner compartment, wherein the diaphragm is a fluorine resin membrane, the different-polar electrodes include a platinum-plated titanium mesh anode and a nickel mesh cathode, the width of the inner electrode compartment is 20 mm and the electrolytic solution is water having a resistance of 5,000 Ωcm.

7. An electrolytic cell as in claim 1 having two inner compartments, wherein the diaphragm is a cationic exchange membrane, the different-polar electrodes include a porous titanium plate provided with a 1 mm-thick surface layer of $\beta$-lead dioxide and a porous 1 mm-thick nickel plate cathode, and the electrolytic solution is a mixed acid of 5 g/l of sulfuric acid and 2 g/l of hydrofluoric acid.

8. An electrolytic cell as in claim 1 having an even number of at least four compartments, wherein an anode electrode and a cathode electrode are separately present in each of the outer compartments, said outer compartment electrodes being further connected to an anode collector and cathode collector, respectively.

9. An electrolytic cell as in claim 1 having an odd number of at least three compartments, wherein one of the electrodes present in one of the outer electrode compartments is further connected to a collector, one of said inner electrodes of opposing polarity to said outer electrode being further connected to a second collector of opposing polarity to said first collector.

* * * * *